April 15, 1952  W. F. O'NEIL  2,592,724
INNER TUBE FOR PNEUMATIC TIRES AND METHOD OF MAKING
Filed March 4, 1948  3 Sheets-Sheet 1
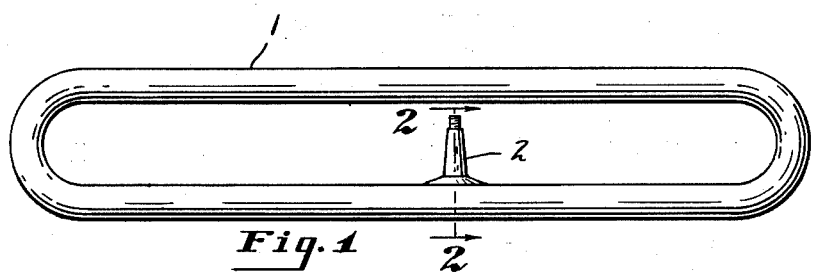
Fig. 1
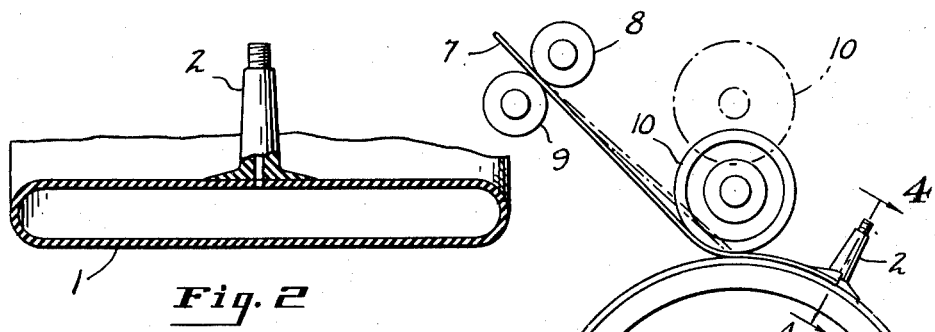
Fig. 2
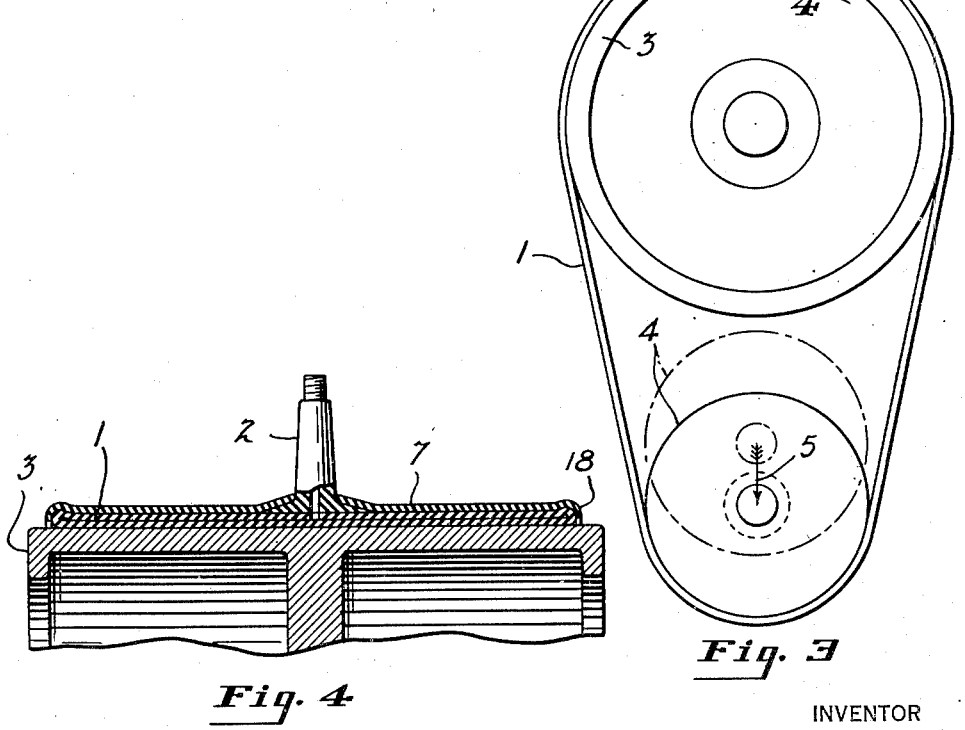
Fig. 3
Fig. 4
INVENTOR
William F. O'Neil
BY Evans + McCoy
ATTORNEYS

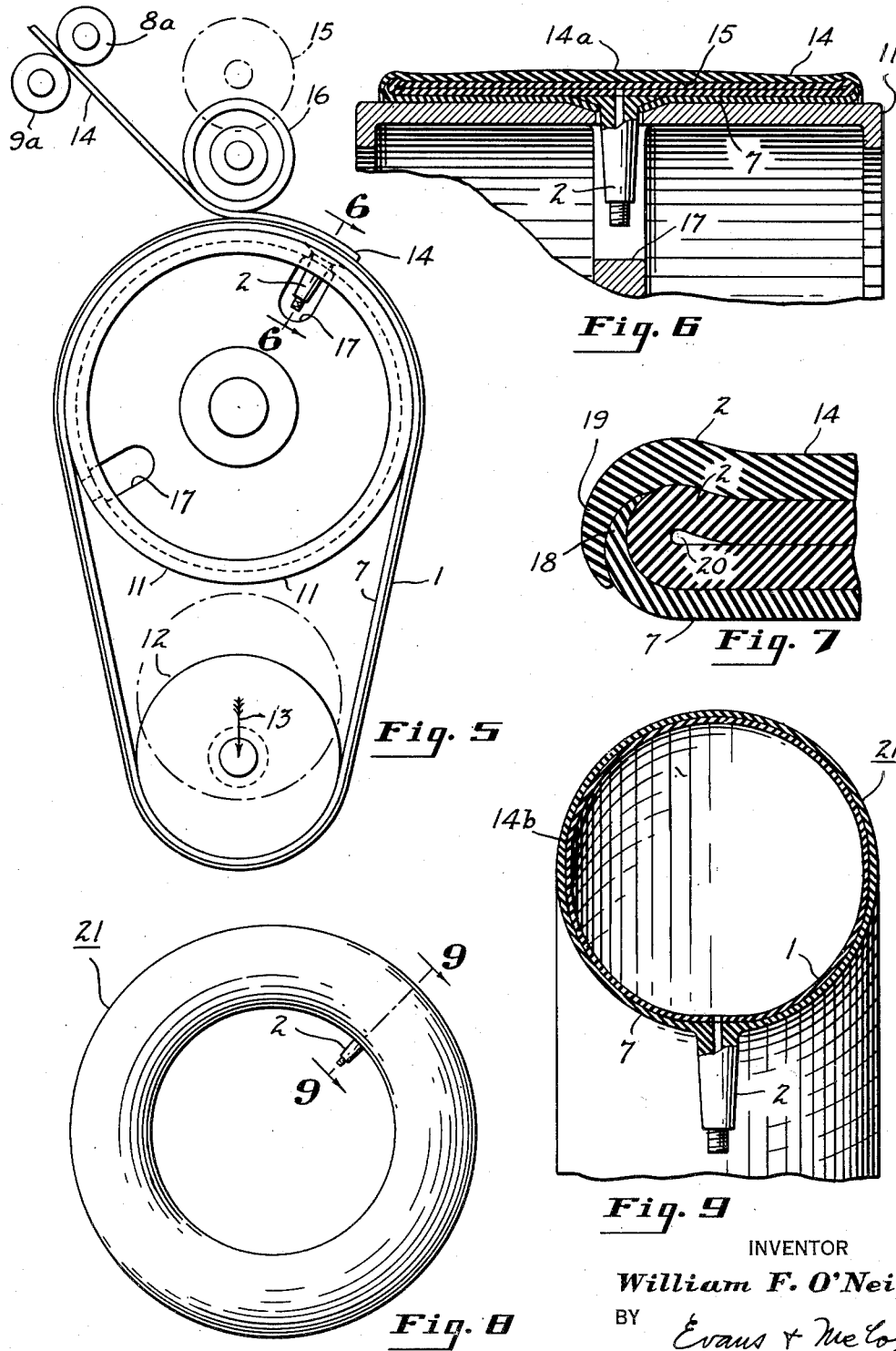

April 15, 1952     W. F. O'NEIL     2,592,724
INNER TUBE FOR PNEUMATIC TIRES AND METHOD OF MAKING
Filed March 4, 1948     3 Sheets-Sheet 3

INVENTOR
William F. O'Neil
BY Evans + McCoy
ATTORNEYS

Patented Apr. 15, 1952

2,592,724

UNITED STATES PATENT OFFICE 2,592,724

INNER TUBE FOR PNEUMATIC TIRES AND METHOD OF MAKING

William F. O'Neil, Akron, Ohio, assignor to The General Tire and Rubber Company, Akron, Ohio, a corporation of Ohio Application March 4, 1948, Serial No. 12,935

15 Claims. (Cl. 152—349)

This invention relates to inner tubes for pneumatic tires and to a method of making same. It particularly relates to an inner tube having the advantages of both "Butyl" (G. R. I.) and natural rubber inner tubes.

"Butyl" or "G. R. I." rubber is a vulcanizable rubbery polymerization product of isobutylene, more specifically it is a copolymer of isobutylene and a diolefinic compound (preferably a conjugated diolefinic compound with less than 7 carbon atoms) such for example as isoprene or butadiene. The "Butyl" rubber forming monomers are polymerized with an acidic or Friedel-Crafts catalyst at temperatures below −40° C. Inner tubes made from this rubber have advantages over those made from natural rubber or other synthetics in that they have relatively low permeability to air and withstand to a marked degree the generally destructive scrubbing action had when a tire is run in a flattened condition.

Vulcanized "Butyl" rubber compositions, however, lack some of the retractability of vulcanized natural rubber compounds after they have been stretched, with the result that inner tubes made from "Butyl" rubber compositions usually grow beyond their molded state when inflated. Therefore, used "Butyl" tubes cannot be satisfactorily incorporated into new tire casings without wrinkles occurring and causing tube failure. "Butyl" rubber also has the undesirable property of becoming frangible at temperatures below −20° F., with the result that tubes crack, break up, or fail to hold air in many northern regions during winter weather.

It is an object of the present invention to provide an inner tube for pneumatic tires which will retract to about original size after it has been retained in an expanded state for a considerable period, which holds air at a temperature well below −20° F., and which has all advantages had by natural rubber and "Butyl" rubber tubes.

It is another object of the present invention to provide a method of making an inner tube having low permeability and the advantages of natural rubber inner tubes.

Other objects will be apparent from the following description of the invention, illustrated by the accompanying drawing, in which:

Figure 1 is an elevational view of a suitable base tube formed and cured of a "Butyl" rubber compound in accordance with the first step of the process of the present invention;

Fig. 2 is a sectional view taken on the line 2—2 of Fig. 1;

Fig. 3 is a side elevational view of apparatus for super-imposing a ply or layer of natural rubber over one side of and in adhesive contact with the flattened and cured base tube of "Butyl" rubber formed in the first step of the process; the base tube and a portion of the ply or strip material of natural rubber or an equivalent thereof is shown in a position during the assembly process.

Fig. 4 is a sectional view through the tube and a portion of the apparatus of Fig. 3, taken on the line 4—4 of Fig. 3;

Fig. 5 is an elevational view of apparatus used for applying a layer of rubber to the portion of the "Butyl" rubber tube remaining after the application of the rubber layer applied by the apparatus of Fig. 3, showing the elements of the tube in a position on the apparatus occupied during one of the assembly steps.

Fig. 6 is a sectional view through a portion of the apparatus and tube elements as taken along the line 6—6 of Fig. 5;

Fig. 7 is an enlarged sectional view through a portion of the tube of the present invention just prior to the final curing operation;

Fig. 8 is an elevational view of the completed cured tube embodying the present invention, which completed tube has preferably been enlarged during final curing step to have a mean diameter and circumference greater than the respective diameter and circumference of the base tube of Figure 1;

Fig. 9 is a sectional view along the line 9—9 of Fig. 8;

Figure 10:
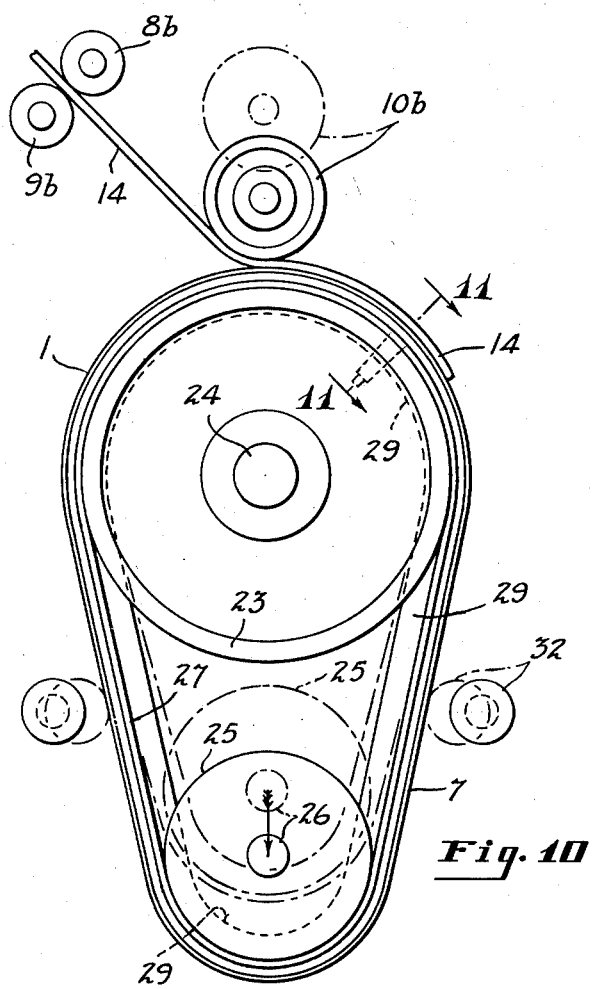
Fig. 10 is a side elevational view of a preferred modified form of apparatus for making a tube embodying the present invention showing some of the elements of the tube in position thereon.

I have found that an inner tube having both the desirable characteristics of "Butyl" and natural rubber is produced by superimposing over a base tube of "Butyl" rubber, an adherent layer of natural rubber, or substantially equivalent rubbery polymerization or copolymerization product of a diolefinic compound such as chloroprene, a cyanoprene, butadiene, isoprene and the like, in which polymerization product the diolefinic compound is at least 50% of the polymerized constituent. Many attempts were made to cure uncured "Butyl" rubber and a more unsaturated uncured rubbery material such as natural rubber in contact with each other to form articles in which the "Butyl" and natural rubbers are strongly adherent. But, as far as I have determined, all such attempts have resulted in an unsatisfactory article, due perhaps to the tendency of natural rubber to withdraw curing agents from the "Butyl" rubber and hence become improperly cured in the region of their interface. When, however, the "Butyl" rubber is first cured, natural rubber may be vulcanized thereto in a satisfactory manner.

In the preparation of inner tubes of the present invention, therefore, an air-retaining base tube of "Butyl" rubber is first formed and cured in a suitable shape, preferably in the shape of a hollow annulus having a generally flattened or oblong cross section with one dimension, usually a transverse dimension (width) greater than the other perpendicular dimension usually the radial dimension (depth), as shown in Figs. 1 and 2. A covering layer of a rubbery polymer, such as natural rubber, with comparatively higher chemical unsaturation, is disposed over the entire surface of the cured base tube to form a composite tube blank which is then cured in a mold of suitable size and shape for forming a tube of the desired dimensions. The mold is preferably dimensioned to cure a tube of round cross section, of torroidal shape, and with a mean diameter and cross sectional area somewhat greater than the respective diameter or cross section of the base tube of butyl rubber.

In superimposing the rubber covering over the cured "Butyl" base tube, a major problem is to eliminate the formation of air bubbles or air pockets between the base tube of "Butyl" rubber and the covering of the rubber having greater chemical unsaturation. Another problem is to obtain a finished tube of the desired uniformity of wall thickness. I have found that these problems are more readily overcome by preparing the initial base tube of "Butyl" rubber in a size smaller than is desired for the finished tube, flattening the section preferably by stretching a portion (preferably the entire tube) over a supporting surface, applying a covering which is generally in the form of a strip or sheet of the curable rubber composition over and in adhesive contact with the flat surfaces of the base tube while the latter is supported by the supporting surface and preferably in the stretched condition, substantially without air in the portion of the cavity over which the covering is being pressed. In one method of assembly illustrated in Figs. 3 to 9, a strip is applied over and pressed against an outer peripheral flat surface of the flattened base tube to form a complete band around the periphery thereof, and the base tube removed, turned over to expose the other flat side, again stretched and a strip of the rubber compound pressed over the remaining uncovered surface of the base tube to form a composite tube blank which may be cured in a suitable mold to produce a tube of the present invention with desired dimensions. When the base tube is molded in a form having flattened or oblong cross section, as shown in Fig. 2, the application of the less chemically saturated rubber covering to the outer periphery thereof is greatly facilitated and the amount of required stretching reduced.

Figure 12:
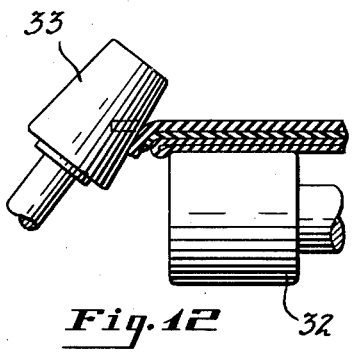
Fig. 12 is a sectional view of the inner tube showing the rollers for turning over end portions of the rubber layer.
Figure 11:
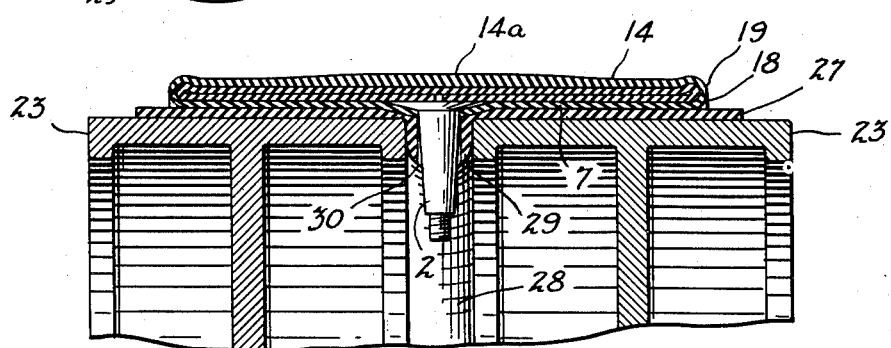
Fig. 11 is a sectional view on the line 11—11 of Fig. 10.

In the method of assembly of the composite tube blank illustrated by Figs. 10 to 12 inclusive, the covering is applied to both flattened surfaces of the base tube without removing it from the support.

Referring more particularly to Figs. 1 to 9 of the drawings, wherein like parts are designated by like numerals of reference throughout the several views, I prepare base tube 1 having a conduit or valve stem 2 with a suitable passageway therethrough to permit controllable supply of inflation fluid to the cavity 20 thereof. The base tube 1 may be made from a vulcanizable compound of "Butyl" or G.R.I. rubber in the usual way but is preferably vulcanized in a mold of suitable shape to provide an annular molded tube of flattened cross-sectional contour as shown in Fig. 2. The fluid is preferably expelled from the cavity of the base tube 1 to permit its collapse. Then it is applied over suitable forming surface or over tensioning means such as the drum 3 and idler 4, while the latter is in the position shown by the broken line. The idler 4 is then moved in the direction of the arrow 5 to stretch the tube sufficiently so that it retains its flattened shape on the drum 3. The tube may be turned in an inside-out manner so that the valve stem 2 is extended outwardly on the drum 3.

A covering layer or strip of calendered rubbery material 7, which is supplied from a source (not shown) between the guide and drag rolls 8 and 9, may be applied to the drum under pressure supplied by downward force exerted by the pressure roll 10. By rotation of the drum 3, the idler 4 and the pressure roll 10, the layer 7 may be applied over the entire inner periphery of the tube to form the lamina 7. Drag of the guide rolls may be used to stretch the strip 7 slightly as it is being applied to the base tube 1. The layer of rubber 7 has slightly greater width than the flattened tube 1 and has skived edge portions to overlie the ends of the flattened tube 1, as shown in Fig. 4. It has just sufficient length to form a complete band around the tube when in the stretched condition, as shown in Fig. 3.

After application of the band of natural rubber or other rubberlike material 7, the tube and covering layer are removed from the drum 3 and turned over and placed around the drum 11 and the idler roll 12, which has a central annular groove therein to receive the valve stem 2 while the idler is in the position of the broken lines illustrated in Fig. 5. The roll 12 is then moved in the direction of the arrow 13 sufficiently to maintain in a form having a flattened cross section, that portion of the tube blank and its partial covering 7 that bears against the supporting surface of the drum 11. A sheet or strip of calendered rubberlike material 14, supplied from a suitable source (not shown) between drag rolls 8a and 9a and preferably having a slightly thickened central portion 14a, is applied to the exterior surface 15 under the pressure roller 16 by simultaneous rotation of the drum 11, the idler roll 12 and the pressure roller 16. The drum 11 is provided with a suitable recess 17 to receive the valve stem 2. Skived end portions 19 of the rubber layer 14 overlie the respective skived end portions 18 of the rubber layer 7. The pressure exerted by the roller 16 during rotation of the drum 11 together with pressure that may be exerted by manipulation of the operator is sufficient to cause elimination of air between the rubber layers 7 and 14 and the surfaces of the "Butyl" tube 1 with which they are in contact. Pressure exerted by the operator is sufficient to cause cohesion of the end portions 18 and 19.

An adhesive film (not shown) deposited from a suitable adhesive liquid or solution is preferably disposed between the vulcanizable covering layers 7 and 14 and the outer surface of the vulcanized base tube. The adhesive film is preferably a rubber cement or a solution of natural rubber although other vulcanizable adhesives such for example as solutions of vulcanizable synthetic rubbers that exhibit building tack to the covering layer may be used. The film may be deposited by applying the solution to the entire surface of the base tube or the surface of the covering layer or both and permitting evaporation of solvent or liquid therefrom.

The composite tube blank having the walls of the fluid retaining chamber 20 defined by continuous tubular walls formed of "Butyl" rubber and a continuous covering of a vulcanizable rubber compound such as a natural rubber compound, as shown in Figure 7, is then incorporated in a suitable tube-forming mold which preferably has a mean diameter that is larger than the mean diameter of the "Butyl" base tube 1 formed or used in the first step of the process of the present invention. The outer tubular layer or covering is cured and shaped by the application of heat from the mold and by pressure supplied to the cavity 20 to form a tube 21 of the desired dimensions and preferably of toroidal shape illustrated by Figures 8 and 9. Because of the increase in diameter of the tube during the final curing operation, the thickness of the central portion of the layer 14 is reduced and the final tube has a uniform wall composed of the continuous vulcanized outer tubular layer 14b (formed from unvulcanized layers 7 and 14) and inner-continuous tubular layer formed of a "Butyl" rubber composition. The layers 1 and 14b are adhered together by vulcanization.

In my modified process illustrated by Figs. 10 to 12 inclusive, a composite tube blank substantially identical with that of Fig. 7, is formed with but one stretching operation. An expandable supporting surface is provided for the assembling of the elements of the composite tube blank. This expansible supporting surface may be conveniently provided by the surface of a belt or band of extensible and retractable material such as a belt of a reinforced vulcanized rubber compound carried by pulleys whose axes are moveable toward and away from each other to elongate and retract the belt. Thus, the drums 23 and the idlers 25 which rotate on the shafts 24 and 26 respectively, carry a belt 27 of resilient material, preferably a relatively stiff vulcanized rubber, such as may be used for forming tire treads and the like. The shaft 26 is moveable between the positions illustrated by its broken and solid lines in Fig. 10. The identical drums 23 and the identical idlers are axially separated to provide a space 28 to receive the valve stem 2 and an aligning and stiffening rib 29 which is also provided with an opening 30 to receive the valve stem or conduit 2.

In the building of composite tubes with the apparatus of Figs. 10 to 12, the band 7 and the base tube 1 are successively applied over the belt 27 while the idler 25 is in the position shown by the broken lines of Fig. 10 so that the belt 27 is in the retracted state. The base tube is thereby superimposed on the tacky band 7 while the tube 1 is in the unstretched state so it can be readily aligned. The base tube 1 is stretched and flattened against the band 7 by rotating the drums 23, and the idlers 25 while the idlers are slowly moving from the position of the broken lines to the position of the solid line in Fig. 10.

The tackiness of the band 7 to the surface of the belt 27 assists in preventing separation of any portion of the band during the stretching operation and the gradual flattening of the section of the base tube helps eliminate air. Further elimination of any air pockets is provided by pressure from the pressure roller 10b which is moved against the upper flat surface of the stretched base tube while the drum 23 is rotating.

The skived end portions 18 of the band 7 may be conveniently turned up to contact and cover the edge portions of the tube 1 by contacting the outer edge portion of the flat surface of the base tube 1 with a backing roller 32 and turning up the edge of the belt 27 so that it bears against it by the use of the hand operated roller 33.

The outer covering layer 14 also supplied from a suitable source (not shown) through the drag rolls 8b and 9b, is thereafter applied to the outer flat and uncovered surface of the base tube in the same way as in Fig. 5.

In accordance with the provisions of the patent stautes, the principle of operation of the invention, together with the apparatus now considered to represent the best embodiment thereof, have been described; but it is desired to have it understood that the apparatus shown is only illustrative, and that the invention can be carried out by other means.

What I claim is:

1. An inner tube for pneumatic tires comprising an endless inner tubular layer of a compound of a rubbery copolymer of isobutylene and a diolefinic compound which copolymer contains isobutylene in preponderance and an endless outer tubular layer of a rubbery polymer of a vulcanized, compounded, conjugated diolefinic compound of less than seven carbon atoms, and a conduit for controllably supplying inflation fluid to the cavity of said inner tubular layer, the entire inner surface of said outer tubular layer bearing against and being directly bonded by vulcanization of said outer layer to the outer surface of said inner layer, both the outer layer and the inner layer of said tube being at the same time in a natural unstressed and molded state, said outer layer having the flow characteristics of a rubber layer that has been vulcanized in contact with a prevulcanized inner layer and in contact with a rigid, annular forming surface.

2. An inner tube for pneumatic tires having a passageway for controllably inserting or withdrawing inflation fluid, the walls of said tube having an inner endless fluid-retaining tubular layer of vulcanized compound of a vulcanizable rubbery polymerization product of isobutylene and an outer endless tubular layer of a vulcanized natural rubber compound, the entire inner surface of said outer tubular layer being directly bonded to the outer surface of said inner tubular layer by vulcanized rubber, said inner tube having in its unstressed state an annular shape and showing the smooth surface imparted by direct contact during vulcanization with an annular cavity having rigid walls.

3. A tube comprising an inner tubular layer of a vulcanized compound of rubbery copolymer of isobutylene and isoprene, in which copolymer the isobutylene residue is present in preponderance, and an outer layer of a compound of a rubbery polymer having greater chemical unsaturation, the inner surface of said outer layer being adhered by vulcanization over its entire surface directly to the outer surface of said inner layer, said outer layer and said inner layer showing the flow characteristics had when the inner layer is vulcanized prior to the outer layer and the outer layer is vulcanized between a vulcanized inner-tubular layer and a rigid forming surface.

4. A method of making tubes for retaining air in pneumatic tires which comprises flattening portions of an endless fluid-retaining base tube, which is formed principally of a vulcanized compounded copolymer of isobutylene and a diolefinic compound copolymerizable therewith, applying against the entire flattened outer surface of said base tube a layer of a vulcanizable rubber compound to form a composite tube blank having an outer continuous wall formed of an inner endless tubular layer of said vulcanized compounded copolymer and an outer endless layer of said vulcanizable rubber compound, and bonding the said inner and outer layers directly together over their entire contacting areas by curing the composite tube blank in an annular mold under pressure applied to the cavity of said base tube.

5. A method of making an inner tube for pneumatic tires having low permeability to air, said method comprising stretching an endless vulcanized base tube having a fluid-retaining cavity over a rigid surface to cause it to flatten in cross section and form a band having inner and outer flattened surfaces, applying over the entire outer surface of said flattened base tube a covering layer of uncured but curable natural rubber compound, pressing the entire inner surface of said covering layer against said surface of said base tube to form an endless outer layer over said base tube, and curing the composite tube blank thus formed in an annular tube-forming mold with the aid of heat and pressure applied to the cavity of said base tube, said base tube being formed of a compounded vulcanized rubbery copolymer of a major proportion of isobutylene and a minor proportion of a diolefinic compound.

6. The method of claim 5 wherein the endless vulcanized base tube is molded in a shape having oblong cross section.

7. A method of making an inner tube for pneumatic tires comprising forming an endless fluid-retaining base tube of a compounded copolymer of isobutylene and a diolefinic compound in a form having a substantially uniform transverse cross section of oblong shape, flattening said base tube in a direction to increase the length of the longest cross sectional dimension and so that opposite wall portions bear against each other, applying a layer of unvulcanized but heat vulcanizable rubber compound in direct adhesive contact with each of said flattened surfaces and joining edges of layers on opposite sides to form an endless tube over the entire outer surface of said base tube, and curing the said outer layer in an annular mold with the aid of pressure exerted by fluid in said base tube forcing said outer layer against the walls of the mold, whereby said outer layer is bonded by vulcanized rubber over its entire inner surface to said base tube and said base tube is permanently stretched to the form of the cavity of the curing mold.

8. The method of claim 7 wherein the base tube has a cross section with a transverse dimension more than twice its radial dimension.

9. The method of claim 7 wherein an adhesive film deposited from solution is interposed between the outer surface of the base tube and the inner surface of said layers.

10. The method of claim 5 wherein an adhesive film deposited from a solution is disposed between said base tube and said covering layer, and wherein said composite tube blank is cured in a mold having a cavity with a mean diameter greater than that of said base tube.

11. The method of claim 5 wherein said base tube is molded to have an oblong section, wherein it is flattened in a direction such that the major sectional dimension is increased and wherein an adhesive film deposited from a solution is disposed between said base tube and said covering layer, and wherein said composite tube blank is cured in a mold having a cavity with a mean diameter greater than that of said base tube.

12. A method of making an inner tube for pneumatic tires which comprises disposing over an expansible surface a continuous band of an uncured but curable rubber compound, superimposing over the outer peripheral surface of said band in curable contact with substantially the entire outer surface of said band an annular base tube having a fluid-retaining cavity, conduit means for controllably supplying fluid thereto and continuous tubular walls of a vulcanized compounded rubbery polymerization product of isobutylene and a diolefinic compound, expanding said surface of said band and said tube to larger circumferences to flatten the cross-section of said tube and to press a peripheral flat surface thereof against the outer peripheral surface of said band, applying over the outer peripheral surface of said expanded tube a second band of uncured but heat curable rubber compound, said bands of curable rubber compound being of sufficient width to together completely envelop said base tube, pressing said second band against said tube and pressing the side edges of said curable bands together to form a continuous composite tube blank having a fluid-retaining cavity therein and having walls formed of an inner endless tube layer of isobutylene base polymer and an outer continuous tube layer of a vulcanizable rubber compound, incorporating said tube blank in an annular mold and banding the entire inner surface of the outer curable tubular layer thereof by direct vulcanization to the entire outer surface of said inner cured tubular layer while curing said outer layer in said mold with the aid of fluid pressure supplied to the cavity of said inner layer.

13. The method of claim 12 wherein the composite tube blank is stretched to a diameter greater than the mean diameter of the base tube during the curing step.

14. The method of claim 12 wherein the base tube has an oblong section of greater transverse dimension than radial dimension, wherein the composite tube blank is stretched to a diameter greater than the mean diameter of the base tube during the curing operation, and wherein the composite tube blank is cured in toroidal form.

15. An inner tube for pneumatic tires comprising an outer annular layer of cured natural vulcanized rubber compound and an inner annular tubular layer of a vulcanized compound of a rubbery polymerization product of a major quantity of isobutylene and a minor quantity of a diolefin and a conduit for controllably supplying inflation fluid to the cavity of said inner tubular layer, the entire inner surface of said outer layer bearing against and being directly bonded to the outer surface of said inner tubular layer by vulcanized rubber, said inner tube having in its unstressed state an annular shape and showing the smooth surface imparted by direct contact during vulcanization with an annular cavity having rigid walls.

WILLIAM F. O'NEIL.

REFERENCES CITED

The following references are of record in the file of this patent:

UNITED STATES PATENTS

| Number | Name | Date |
|---|---|---|
| 472,485 | Phelps | Apr. 5, 1892 |
| 497,971 | Tillinghast | May 23, 1893 |
| 702,869 | Collier | June 17, 1902 |
| 1,657,052 | Webster | Jan. 24, 1928 |
| 1,818,349 | Ott | Aug. 11, 1931 |
| 1,862,314 | Laursen | June 7, 1932 |
| 2,022,230 | Cavanaugh | Nov. 26, 1935 |
| 2,061,522 | Shively | Nov. 17, 1936 |
| 2,194,341 | Voorhees | Mar. 19, 1940 |
| 2,467,322 | Lightbown et al. | Apr. 12, 1949 |
| 2,474,511 | Bacon | June 28, 1949 |
| 2,493,047 | Waber | Jan. 3, 1950 |